United States Patent [19]

Baitcher et al.

[11] Patent Number: 5,047,191

[45] Date of Patent: Sep. 10, 1991

[54] METHOD FOR MANUFACTURING LOUDSPEAKER DIAPHRAGM

[75] Inventors: Neal L. Baitcher, Fort Wayne; Robert M. Brennan, Columbia City, both of Ind.

[73] Assignee: Fibre Form Corporation, Columbia City, Ind.

[21] Appl. No.: 892,066

[22] Filed: Jul. 30, 1986

Related U.S. Application Data

[62] Division of Ser. No. 787,306, Oct. 15, 1985, Pat. No. 4,646,874.

[51] Int. Cl.[5] .............................................. B29C 67/00

[52] U.S. Cl. .................................... 264/112; 264/510; 264/252; 264/257; 264/303

[58] Field of Search .................. 264/517, 252, 86, 87, 264/303, 250, 257, 510, 112

[56] References Cited

U.S. PATENT DOCUMENTS

| | | | |
|---|---|---|---|
| 1,872,583 | 8/1932 | Hawley | 181/169 |
| 2,302,178 | 11/1942 | Brennan | 181/169 |
| 2,605,855 | 8/1952 | Lenz | 264/324 |
| 3,408,438 | 10/1968 | Staunton | 264/252 |
| 3,807,146 | 4/1974 | Witkowski | 264/252 X |

*Primary Examiner*—Mary Lynn Theisen
*Attorney, Agent, or Firm*—Woodard, Emhardt, Naughton, Moriarty & McNett

[57] ABSTRACT

A felted paper loudspeaker diaphragm in which the felted paper of the annular supporting flange is thinner, and of lesser density and higher compliance then the cone body. The supporting flange is permeated with a high compliance elastomer which provides most of the tensile strength of the supporting flange.

1 Claim, 1 Drawing Sheet

METHOD FOR MANUFACTURING LOUDSPEAKER DIAPHRAGM

This application is a division of application Ser. No. 787,306, filed Oct. 15, 1985, which issued into U.S. Pat. No. 4,646,874 on Mar. 3, 1987.

BACKGROUND OF THE INVENTION

The present invention relates to the field of loudspeaker diaphragms, also known as speaker cones, used for radiating audio frequency sound.

Loudspeaker diaphragms are manufactured in a wide variety of forms by many different processes and utilizing a wide range of materials, depending upon the desired characteristics of the finished loudspeaker and the desired price class. One of the most common materials used for constructing loudspeaker diaphragms is paper. One way of constructing a paper diaphragm is to form an initially flat sheet of paper into a cone and join it together along a more or less radially oriented seam where the edges of the paper meet. The crude cone thus formed is then pressed in a die to conform it to the desired final shape, which includes a central sound radiating cone body and an outwardly extending annular supporting flange. The supporting flange usually is impressed with one or more annular corrugations to increase its flexibility.

The above method of constructing paper cones is generally recognized as being inferior to the more commonly employed method of felting the paper cone from a fiber suspension directly into the desired final form. Properly felted paper cones are free from most stresses inherent in pressed paper cones, and the paper properties can be controlled and varied and thereby modified to obtain the desired acoustical behavior of the finished loudspeaker.

A particular problem inherent to the construction of one-piece felted paper loudspeaker diaphragms is that the required stiffness of the sound radiating portion of the loudspeaker diaphragm is at odds with the required flexibility of the annular supporting flange. As modern loudspeakers have been called upon to efficiently reproduce low audio frequencies at high power, loudspeaker diaphragms have been required to undergo large linear displacements, somewhat like a reciprocating piston. Consequently, it has been necessary to provide the loudspeaker diaphragm with a high compliance supporting flange, that is, a supporting flange having sufficient flexibility to provide a low resistance to displacement, or excursion, of the cone body. At the same time, the high compliance supporting flange must possess sufficient tensile strength to withstand the stresses placed upon it by repeated large excursions without failing prematurely.

Heretofore, it has been recognized that the compliance of the supporting flange of one-piece felted paper loudspeaker diaphragms could be increased by controlling the felting process such that the paper fibers are deposited at a lesser thickness in the region of the supporting flange than in the region of the sound radiating cone body. However, because felted paper is not an especially strong material, it has been found to be nearly impossible to achieve the desired compliance of the supporting flange portion by this method without unduly reducing the tensile strength such that the supporting flange cannot survive intact when operated at low frequencies and high power.

As a remedy, many loudspeaker diaphragm manufacturers have turned to composite construction of the diaphragm from dissimilar materials. For instance, the sound radiating portion, or cone body, is constructed of felted paper in the conventional manner, and the supporting flange is constructed from a second highly compliant and relatively strong material, such as sheet foam rubber (or more likely, a foamed synthetic elastomer). The two separately constructed pieces are assembled and joined together with an adhesive.

While two-piece composite loudspeaker diaphragms such as just described provide high compliance combined with strength, there are still disadvantages associated with that construction. For instance, the foam supporting flange is usually cut from an initially flat piece of sheet foam and pressed in a heated die to form the annular corrugations therein. This results in significant material waste. It is also relatively expensive to assemble a cone and an annular flange while maintaining concentricity of the two pieces. Another disadvantage of die forming foam flanges is that stresses are introduced into the pressed foam, which stresses are usually not evenly distributed in direction or intensity about the annular configuration. Such stressed foam tends to be environmentally unstable, that is, it will tend to warp when the foam is subjected to heating from the environment, thereby deleteriously affecting the acoustic characteristics of the loudspeaker.

The present invention is directed toward overcoming or alleviating the above mentioned problems by providing a loudspeaker diaphragm configuration and method of producing same which allows a felted paper cone body to be provided with a highly compliant yet strong elastomeric supporting flange without requiring separate construction and assembly of the flange and the cone body. The supporting flange is also homogeneous and free of unequal and localized stresses. The result is an essentially one-piece high compliance loudspeaker diaphragm which can operate at low frequencies and high power.

SUMMARY OF THE INVENTION

As a general introduction to the invention disclosed herein, a brief summary of the nature and gist of the invention is set forth below. It should be appreciated however that this summary is not intended as a comprehensive definition of the invention or as limiting the scope thereof. It will be necessary to refer to the claims appended below after the Description of the Preferred Embodiment for a proper definition of that which is regarded as the invention.

Briefly, the present invention contemplates, in part, forming in one piece an integral felted paper loudspeaker diaphragm, including both the cone body and the supporting flange, by a conventional felting process, except that the felting is controlled such that the deposition of fibers in the flange area is much reduced relative to the cone body area. The reduced deposition in the flange area, which might be referred to as "feathering," is much more restricted than in conventional felted diaphragms having reduced thickness flanges. Only enough fibers are deposited to produce a flange-substrate which is self-supporting and able to retain its initially felted configuration during the remaining construction steps. Consequently, the resulting felted flange-substrate is weak and diaphanous; almost gossamer like. The flange-substrate, which is quite porous and permeable, next has an elastomer applied thereto in liquid form, the liquid elastomer permeating and impregnating it. The elastomer is then cured by application of heat, or otherwise as required by the nature of the particular elastomer used.

It should be recognized that the resulting loudspeaker diaphragm has essentially the same characteristics as a two-piece diaphragm having a felted paper cone body and an adhesively attached flange constructed of the same elastomer. This is because the felted paper of the flange-substrate is of such low density and lacking in tensile strength as to have very little effect on the compliance or tensile strength of the cured elastomer. The felted flange-substrate acts merely as a substrate to specify the shape of the supporting flange and as a "mold" for holding the elastomer in the desired shape until it is cured.

DESCRIPTION OF THE PREFERRED EMBODIMENT

Figure 1:
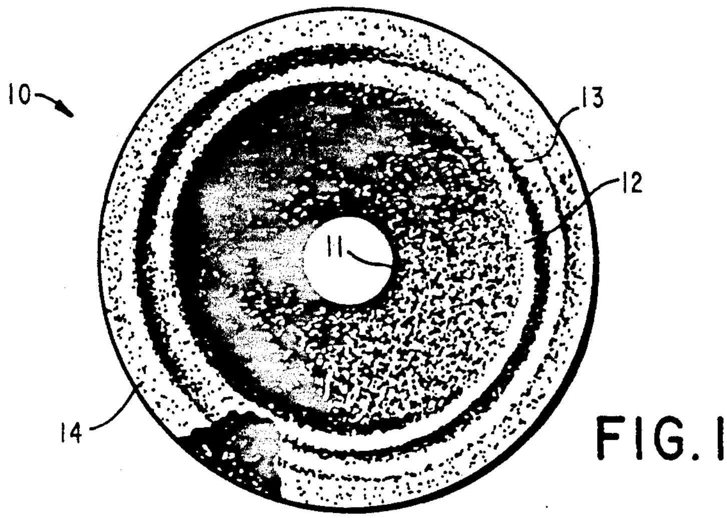
FIG. 1 is a top view of a loudspeaker diaphragm in accordance with the present invention, showing a portion of the elastomer cut away to illustrate the gossamer nature of the flange-substrate.

For the purposes of promoting an understanding of the present invention, reference will now be made to the embodiment illustrated in the drawings and specific language will be used to describe the same. It is nevertheless to be understood that no limitation of the scope of the invention is thereby intended, the proper scope of the invention being indicated by the claims appended below and the equivalents thereof.

Figure 2:
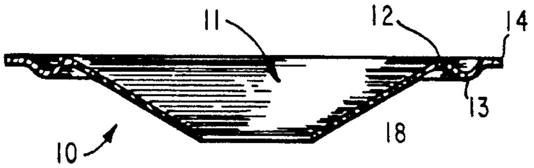
FIG. 2 is a cross sectional elevational view of one half of the loudspeaker diaphragm of FIG. 1.

Referring in particular to FIGS. 1 and 2, there is illustrated in cross section a loudspeaker diaphragm 10 constructed in accordance with the present invention. Diaphragm 10 includes a sound radiating cone body 11 and an annular supporting flange 12 extending outwardly from cone body 11. Supporting flange 12 includes an annular roll or corrugation 13, and a peripheral edge 14. Corrugation 13 increases the compliance of supporting flange 12. It will be readily appreciated by those skilled in the art that a greater number of corrugations of different configuration can be employed as desired, the configuration illustrated merely being typical. Peripheral edge 14 would in a typical application be glued to a metal framework in a finished loudspeaker. For clarity, the thickness of cone body 11 and supporting flange 12 relative to the overall size of loudspeaker diaphragm 10 has been shown greatly exaggerated.

Figure 3:
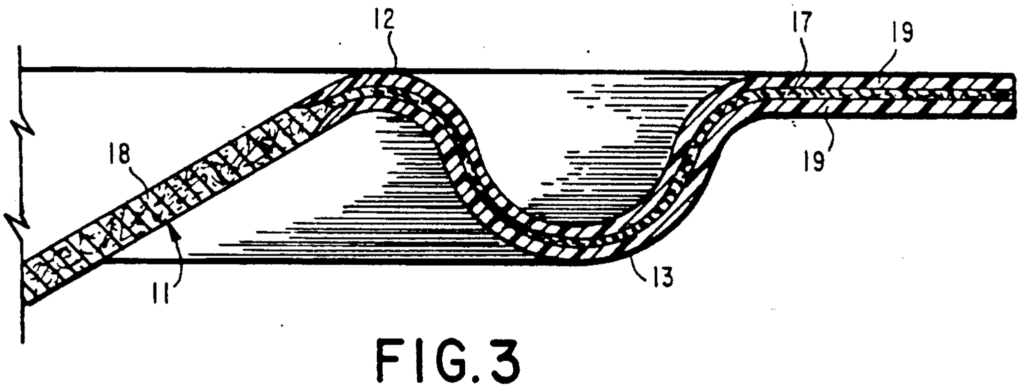
FIG. 3 is an enlarged view of a portion of FIG. 2.

Referring now to FIG. 3, there is illustrated an enlarged view of a cross section of supporting flange 12 and that portion of cone body 11 adjacent thereto. As can be seen more clearly in this figure than in FIG. 2, albeit in a somewhat schematic fashion, supporting flange 12 includes a thin felted paper flange-substrate 17 which is integral with, although thinner and of lesser density than the felted paper 18 of cone body 11. Permeating and surrounding flange-substrate 17 is an elastomer 19.

Inasmuch as the structure of loudspeaker diaphragm 10 can be most readily understood from a description of the process of making it, the following detailed description of the method by which diaphragm 10 is constructed is set forth in lieu of further structural description of the embodiment shown in FIGS. 1-3.

Cone body 11 and flange-substrate 17 are formed by means of a modified version of the conventional felting process by which felted paper cones are usually manufactured. As is well known in the art, a loudspeaker diaphragm can be formed by providing a foraminous form, such as a screen, in the shape of the desired diaphragm configuration, which form is submerged in a water suspension of paper fibers. Suction is applied to one side of the form so as to draw the suspension therethrough, whereupon accretion and felting of the paper fibers occurs on the form opposite the side where suction is applied. The fibers are permitted to build up to the desired thickness, and then the felt is dried, resulting in a felted paper cone. The present process includes a modification whereby the amount of suction in the area of the supporting flange is reduced relative to the suction in the area of the cone body, thereby causing the fibers to accrete more slowly in the flange area. Thus, when the cone body is of the desired thickness, the flange is appreciably thinner and of lesser density per unit area.

Differential deposition as a general matter is known in the art, the distinction of the present process being that no attempt is made to provide a felted flange of sufficient strength by itself to function effectively as a supporting flange. Rather, the flange-substrate of the present invention is usually accreted only enough to provide the strength necessary to support its own weight and the weight of a liquid elastomer (described further below) without losing its initially felted shape, and to meet the specifications required. The flange-substrate, when it is of the proper density and thickness, might be described as being diaphanous or gossamer like.

Subsequent to felting and drying of the felted diaphragm, an elastomer in liquid form is applied to the flange substrate by means of a brush or roller. The liquid elastomer is of such a viscosity that it permeates and impregnates the flange-substrate and surrounds the fibers, the flange-substrate being embedded within the elastomer.

The elastomer-impregnated diaphragm is then heated, or other means as may be appropriate are utilized, to cure the elastomer to a solid flexible state. At this point the resulting diaphragm is essentially a felted paper cone body joined integrally with an elastomer annular supporting flange. The compliance and tensile strength of the elastomer and the amount of elastomer applied to the flange-substrate are such that after curing, the flange-substrate has very little effect upon the compliance and tensile strength characteristics of the supporting flange.

Thus, the present invention provides a composite loudspeaker diaphragm which is as easily formed as one-piece felted paper cones with the attendant advantages of such construction, yet provides the compliance and strength advantages of diaphragms having elastomeric support flanges, all at lesser cost than assembled two-piece composite loudspeaker diaphragms.

It will be readily recognized that the particular fibers utilized and the thickness and density of their deposition in the cone body area will depend upon the desired acoustic qualities of the diaphragm in accordance with principles well known in the art. Likewise, the particular elastomer to be used in connection with the present invention will depend upon such factors as the desired compliance, resonant frequency, Q, damping factor and other recognized parameters. It is therefore difficult to name any particular elastomer as being preferred; however, I have used the following vinyl elastomers successfully in combination with plain paper felted diaphragms: Arco Industries, 440 Eliza, School Craft, Mich. 49087, product numbers 8079H, 8117A, 8085 and 8084. The following is an example of a typical speaker cone made in accordance with the best mode contemplated for making the present invention.

EXAMPLE

Plain paper fibers are felted to form a 3.5 inch diameter speaker cone, including the flange-substrate, the cone body having an average thickness of 0.012 inches and the flange-substrate having an average thickness of 0.005 inches. Arco type #8117A vinyl elastomer is evenly applied with a brush to the flange-substrate at a rate of 0.18 grams per square inch and allowed to penetrate and permeate the flange-substrate. The elastomer treated speaker cone is then baked in an oven at 204° C. for one minute.

While the preferred embodiment of the invention has been illustrated and described in some detail in the drawings and foregoing description, it is to be understood that this description is made only by way of example to set forth the best mode contemplated of carrying out the invention and not as a limitation to the scope of the invention which is pointed out in the claims below.

What is claimed is:

1. A method for constructing a one-piece high compliance loudspeaker diaphragm, comprising the steps of:

a) accreting fibers to form a loudspeaker diaphragm, including a cone body and an annular flange-substrate extending outwardly therefrom, in a controlled manner such that the flange-substrate is formed thinner and at a lesser density per unit area than the cone body, the flange-substrate having insufficient tensile strength of itself to withstand acoustic operation at low frequencies and high power;

b) forming a supporting flange on the loudspeaker diaphragm by permeating the flange-substrate with a liquid elastomer having a sufficient tensile strength, sufficient compliance and in a sufficient amount that when cured, the tensile strength of the supporting flange is primarily attributable to the elastomer and the supporting flange is sufficiently compliant and of sufficient tensile strength to withstand acoustical operation at low frequencies and high power; and c) curing the elastomer.

* * * * *